United States Patent
Presson

(10) Patent No.: US 6,203,103 B1
(45) Date of Patent: Mar. 20, 2001

(54) COLLAPSIBLE FISHING CHAIR WITH DETACHABLE FLOATS

(76) Inventor: Paul V. Presson, 4102 W. Bay Ave., Tampa, FL (US) 33616

(*) Notice: Subject to any disclaimer, the term of this patent is extended or adjusted under 35 U.S.C. 154(b) by 0 days.

(21) Appl. No.: 09/493,730

(22) Filed: Jan. 28, 2000

(51) Int. Cl.$^7$ .................................................. A47C 7/62
(52) U.S. Cl. .............................. 297/188.01; 297/188.08; 297/188.14
(58) Field of Search .................. 297/188.08, 188.11, 297/188.14, 188.19, 39, 217.1, 188.01; 43/54.1; 441/131

(56) References Cited

U.S. PATENT DOCUMENTS

| | | | |
|---|---|---|---|
| 2,555,073 | 5/1951 | Zdankoski | 43/54.4 |
| 3,014,760 | * 12/1961 | Gard | 297/188.08 |
| 3,077,327 | 2/1963 | Batii et al. | 248/42 |
| 3,128,137 | * 4/1964 | Dokter | 297/188.08 X |
| 3,500,485 | 3/1970 | Hillary | 9/343 |
| 3,623,766 | 11/1971 | Funk | 297/188 |
| 4,128,170 | 12/1978 | Elliott | 206/315 |
| 4,191,420 | 3/1980 | Fassett et al. | 297/194 |
| 4,638,593 | 1/1987 | Garcia | 43/54.1 |
| 4,687,452 | 8/1987 | Hull | 441/131 |
| 5,163,694 | * 11/1992 | Reichek | 280/47.26 |
| 5,269,157 | * 12/1993 | Ciminelli et al. | 297/217.1 X |
| 5,334,067 | 8/1994 | Henry et al. | 441/131 |
| 5,350,215 | * 9/1994 | DeMars | 297/188.14 |
| 5,518,431 | 5/1996 | Staley | 441/130 |
| 5,628,544 | 5/1997 | Goodman et al. | 297/188.14 |
| 5,873,192 | * 2/1999 | Chiu | 297/188.08 X |
| 5,899,527 | * 5/1999 | Elvidge et al. | 297/188.14 |
| 6,042,180 | * 3/2000 | Lombardi | 297/217.1 X |

* cited by examiner

*Primary Examiner*—Peter M. Cuomo
*Assistant Examiner*—Stephen Vu
(74) *Attorney, Agent, or Firm*—Joseph N. Breaux

(57) ABSTRACT

A collapsible fishing chair that includes a flotation mechanism for supporting at least a portion of the fishing chair, as well as a quantity of fishing gear, above the water level. The fishing chair is unfoldable to provide a fishing chair once a fishing location is reached. The fishing chair includes elongated legs that terminate in broad support feet. Wheels are optionally provided on the back legs for transporting the fishing chair on hard terrain and surfaces such as fishing piers and the like.

4 Claims, 5 Drawing Sheets

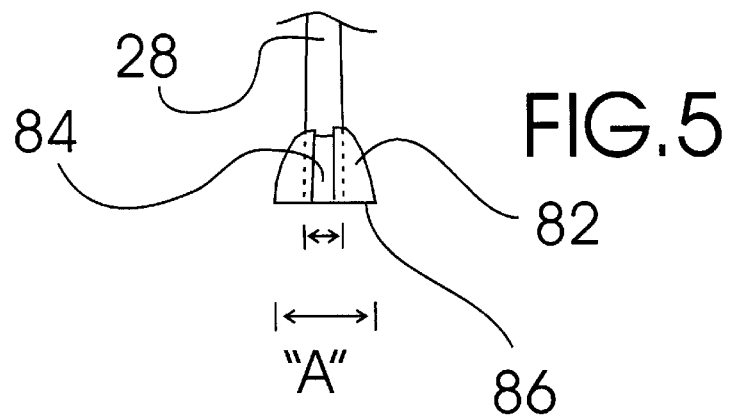
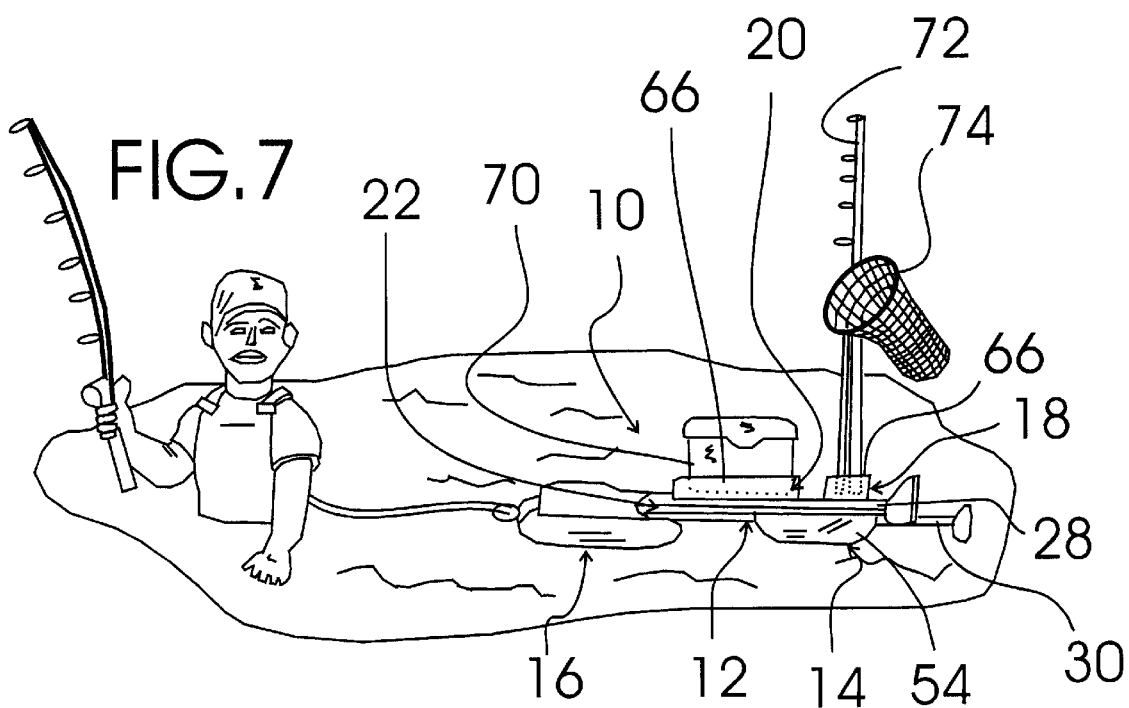

US 6,203,103 B1

COLLAPSIBLE FISHING CHAIR WITH DETACHABLE FLOATS

TECHNICAL FIELD

The present invention relates to fishing accessories and more particularly to a collapsible fishing chair with detachable floats that includes a collapsible, extended leg, chair assembly, a detachable lower float assembly, a detachable upper float, and a storage device; the collapsible, extended leg, chair assembly including a folding chair frame Including a tackle box arm assembly, a drink holder arm assembly, two front legs and two back legs pivotally connected to a chair back/seat assembly including a chair back member and a chair seat member such that the chair back/seat assembly is positionable between an unfolded seat forming position and a folded floating position; the chair back/seat assembly including an umbrella/upper float attachment cavity formed into a top surface of the chair back member; the detachable lower float assembly including two lower float members attached together by a flexible tether secured therebetween; each lower float member including a closed cell foam body having a chair leg receiving channel sized and shaped to snap fit over a section of one of the back legs; the detachable upper float being constructed of closed cell foam and including a chair back member securing structure sized and shaped to friction fit into the umbrella/upper float attachment cavity formed into the top surface of the chair back member; the storage device being attached to the two back legs and sized such that a top storage device surface including indentations therein for holding items is positioned between the two front legs and the two back legs when the chair back/seat assembly is positioned in the unfolded seat forming position; the front legs being positioned between the back legs and the top storage device surface when the chair back/seat assembly is positioned in the folded floating position.

BACKGROUND ART

Fisherman must sometimes wade or float to a desirable fishing location. However, once they arrive at the fishing location, they could often enjoy using a chair to sit in while they are fishing. It would be desirable, therefore, to have a fishing chair that included a flotation mechanism for supporting at least a portion of the fishing chair, as well as a quantity of fishing gear, above the water level and that could be quickly unfolded to provide a fishing chair once a fishing location was reached. Because it can be desirable to sit as high as possible when fishing, it would be further desirable to have a fishing chair with elongated legs. In addition, because the fishing chair would often be set on unstable ground, such as sand, it would also be desirable to have broad support feet attached the legs of the fishing chair.

GENERAL SUMMARY DISCUSSION OF INVENTION

It is thus an object of the invention to provide a collapsible fishing chair with detachable floats that includes a collapsible, extended leg, chair assembly, a detachable lower float assembly, a detachable upper float, and a storage device; the collapsible, extended leg, chair assembly including a folding chair frame including a tackle box arm assembly, a drink holder arm assembly, two front legs and two back legs pivotally connected to a chair back/seat assembly including a chair back member and a chair seat member such that the chair back/seat assembly is positionable between an unfolded seat forming position and a folded floating position; the chair back/seat assembly including an umbrella/upper float attachment cavity formed into a top surface of the chair back member; the detachable lower float assembly including two lower float members attached together by a flexible tether secured therebetween; each lower float member including a closed cell foam body having a chair leg receiving channel sized and shaped to snap fit over a section of one of the back legs; the detachable upper float being constructed of closed cell foam and including a chair back member securing structure sized and shaped to friction fit into the umbrella/upper float attachment cavity formed into the top surface of the chair back member; the storage device being attached to the two back legs and sized such that a top storage device surface including indentations therein for holding items is positioned between the two front legs and the two back legs when the chair back/seat assembly is positioned in the unfolded seat forming position; the front legs being positioned between the back legs and the top storage device surface when the chair back/seat assembly is positioned in the folded floating position.

Accordingly, a collapsible fishing chair with detachable floats is provided. The collapsible fishing chair with detachable floats includes a collapsible, extended leg, chair assembly, a detachable lower float assembly, a detachable upper float, and a storage device; the collapsible, extended leg, chair assembly including a folding chair frame including a tackle box arm assembly, a drink holder arm assembly, two front legs and two back legs pivotally connected to a chair back/seat assembly including a chair back member and a chair seat member such that the chair back/seat assembly is positionable between an unfolded seat forming position and a folded floating position; the chair back/seat assembly including an umbrella/upper float attachment cavity formed into a top surface of the chair back member; the detachable lower float assembly including two lower float members attached together by a flexible tether secured therebetween; each lower float member including a closed cell foam boded having a chair leg receiving channel sized and shaped to snap fit over a section of one of the back legs; the detachable upper float being constructed of closed cell foam and including a chair back member securing structure sized and shaped to friction fit into the umbrella/upper float attachment cavity formed into the top surface of the chair back member; the storage device being attached to the two back legs and sized such that a top storage device surface including indentations therein for holding items is positioned between the two front legs and the two back legs when the chair back/seat assembly is positioned in the unfolded seat forming position; the front legs being positioned between the back legs and the top storage device surface when the chair back/seat assembly is positioned in the folded floating position.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 5 is a side plan view of one of the optional front leg securing feet showing the back leg receiving channels sized to snap friction fit onto a section of one of the back legs when the chair back/seat assembly is positioned in the folded floating position.

FIG. 7 is a side plan view of the collapsible fishing chair with detachable floats of FIG. 1 in use floating on a body of water with the chair back/seat assembly positioned in the folded floating position.

EXEMPLARY MODE FOR CARRYING OUT THE INVENTION

Figure 1:
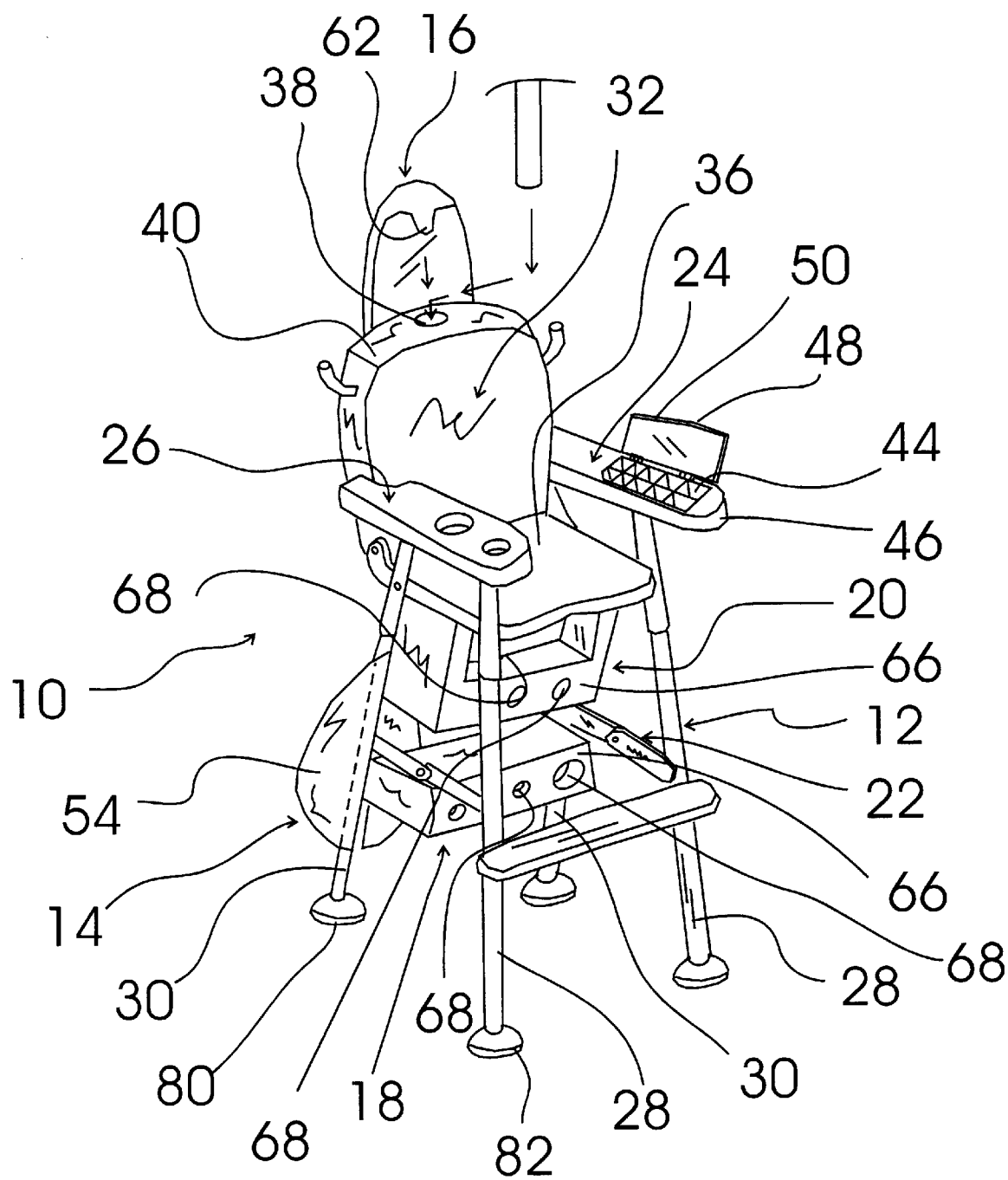
FIG. 1 is a perspective views of an exemplary embodiment of the collapsible fishing chair with detachable floats of the present invention showing the collapsible, extended leg, chair assembly, the detachable lower float assembly, the detachable upper float, and a storage device; the collapsible, extended leg, chair assembly including a folding chair frame including a tackle box arm assembly, a drink holder arm assembly, two front legs and two back legs pivotally connected to a chair back/seat assembly including a chair back member and a chair scat member such that the chair back/seat assembly is positionable between an unfolded seat forming position and a folded floating position; the chair back/seat assembly including an umbrella/upper float attachment cavity formed into a top surface of the chair back member; the detachable lower float assembly including two lower float members attached together by a flexible tether secured therebetween; each lower float member including a closed cell foam body having a chair leg receiving channel sized and shaped to snap fit over a section of one of the back legs; the detachable upper float being constructed of closed cell foam and including a chair back member securing structure sized and shaped to friction fit into the umbrella/upper float attachment cavity formed into the top surface of the chair back member; the storage device being attached to the two back legs and sized such that a top storage device surface including indentations therein for holding items is positioned between the two front legs and the two back legs when the chair back/seat assembly is positioned in the unfolded seat forming position; the front legs being positioned between the back Legs and the top storage device surface when the chair back/seat assembly is positioned in the folded floating position.

FIGS. 1–7 show various aspects of an exemplary embodiment of the collapsible fishing chair with detachable floats of the present invention generally designated 10. Collapsible fishing chair with detachable floats 10 includes a collapsible, extended leg, chair assembly, generally designated 12; a detachable lower float assembly, generally designated 14; a detachable upper float, generally designated 16; and two storage devices, generally designated 18,20. Collapsible, extended leg, chair assembly 12 includes a folding chair frame, generally designated 22, including a tackle box arm assembly, generally designated 24; a drink holder arm assembly, generally designated 26; two front legs 28 and two back legs 30 pivotally connected to a chair back/seat assembly, generally designated 32, including a chair back member 34 and a chair seat member 36.

Chair back/seat assembly 32 is positionable between an unfolded seat forming position (FIGS. 1 and 2) and a folded floating position (FIG. 7). Chair back/seat assembly 32 includes an umbrella/upper float attachment cavity 38 formed into a top surface 40 of chair back member 34. Tackle box arm assembly 24 includes a multi-compartment tackle box structure 44 formed within an arm member 46 and a pivoting tackle box cover 48 having a sealing gasket 50 for providing a water tight seal over multi-compartment tackle box structure 44 when pivoting tackle box cover 48 is pivoted down into a closed position.

Detachable lower float assembly 14 includes two lower float members 54 attached together by a flexible tether 56 secured therebetween. Each lower float member 54 includes a closed cell foam body having a chair leg receiving channel 58 sized and shaped to snap fit over a section of one of the back legs 30. Detachable upper float 16 is constructed of closed cell foam and includes a chair back member securing structure 62 sized and shaped to friction fit into umbrella/upper float attachment cavity 38 of chair back member 34. Storage devices 18,20 are attached to the two back legs 30 and are sized such that top storage device surfaces 66, including multiple indentations 68 therein for holding items such as a cooler 70, fishing rods 72, scoop nets 72, etc., are positioned between the two front legs 28 and the two back legs 30 when chair back/seat assembly 32 is positioned in the unfolded seat forming position. The two front legs 28 are positioned between the back legs 30 and top storage device surfaces 66 when chair back/seat assembly 32 is positioned in the folded floating position.

In the embodiment shown in FIGS. 1,3,4 and 7, the back legs 30 each terminate in a support foot: 80 and the front legs 28 each terminate in a front leg securing support foot 82. Each front leg securing support foot 82 having a back leg receiving channel 84 provided therein sized and positioned to snap friction fit onto a section of one of the back legs 30 when the chair back/seat assembly 32 is positioned in the folded floating position. A bottom surface 86 of each of the front leg securing feet 82 and the support feet 80 has a diameter "A" of six inches which is three times a diameter "B" of two inches of a front and back legs 28,30.

Figure 2:
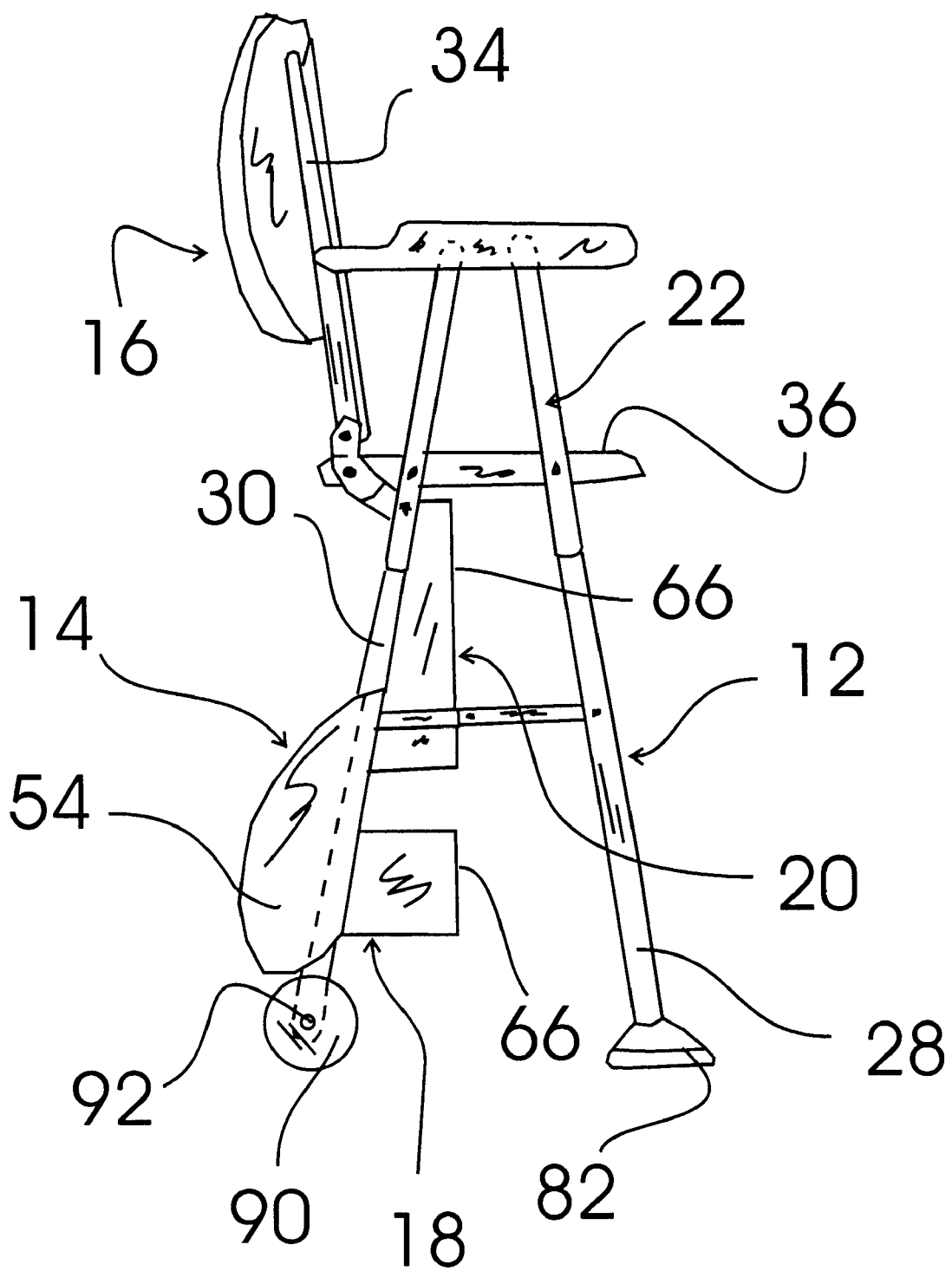
FIG. 2 is a side plan view of a second exemplary embodiment of the collapsible fishing chair with detachable floats of the present invention that is identical to the collapsible fishing chair with detachable floats of FIG. 1 except that the two back legs are provided with an axle and two wheels.
Figure 3:
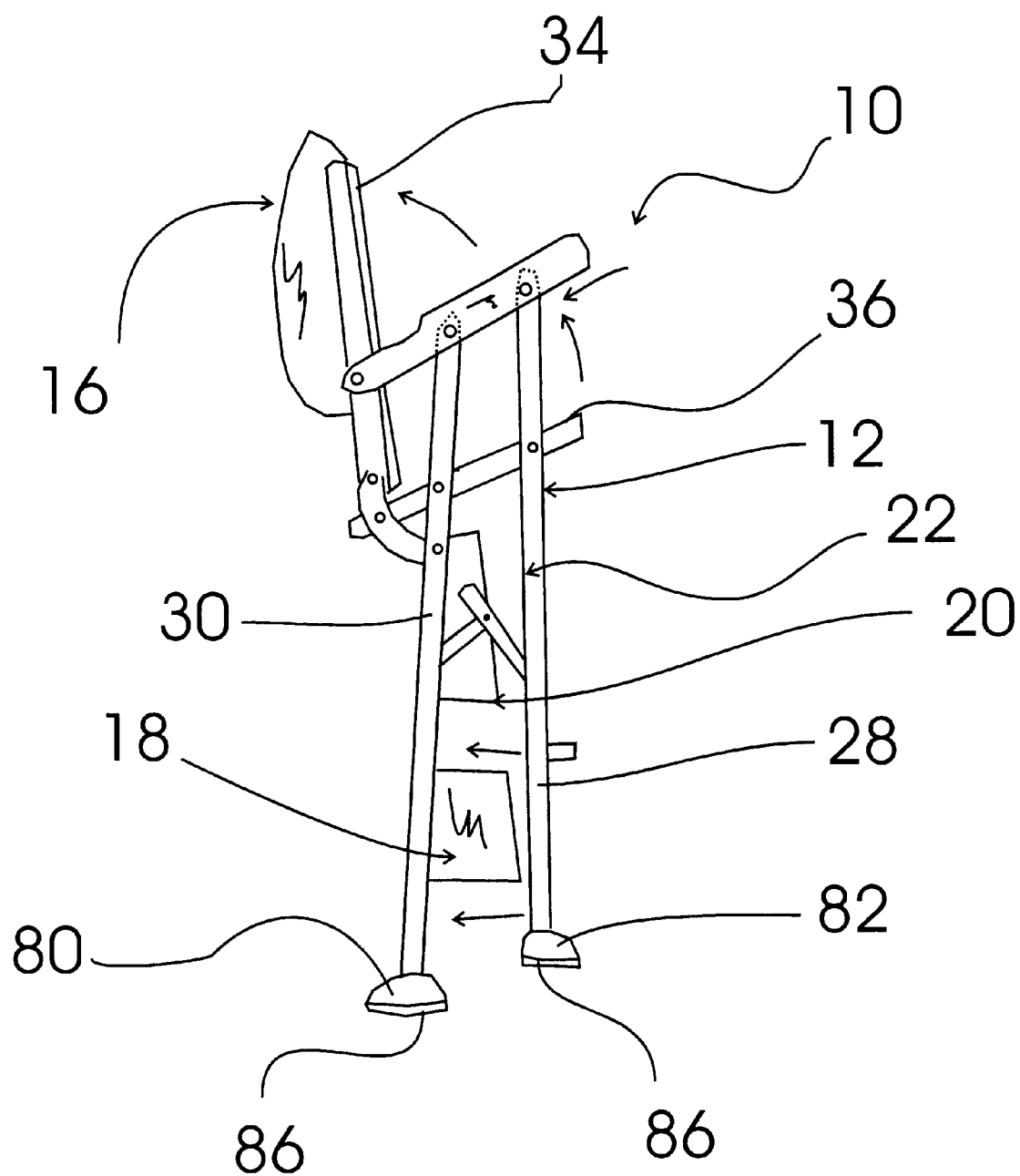
FIG. 3 is a side plan view of the collapsible fishing chair with detachable floats of FIG. 1 showing the chair back/seat assembly positioned between the unfolded seat forming position and the folded floating position.
Figure 6:
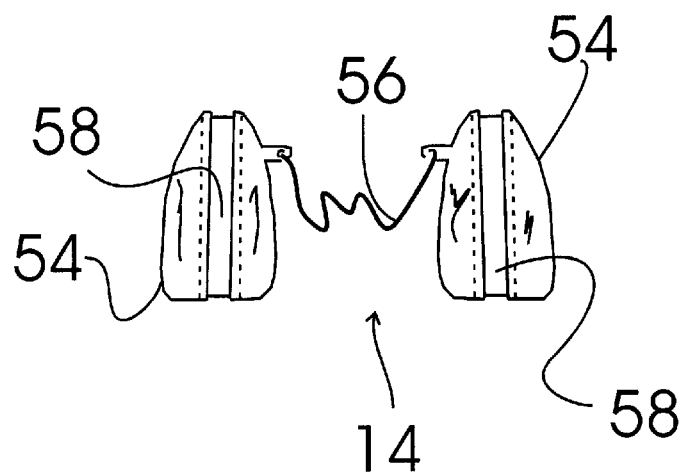
FIG. 6 is a plan view of the detachable lower float assembly showing the two lower float members attached together by a flexible together secured therebetween and the chair leg receiving channel formed into each lower float member.
Figure 4:
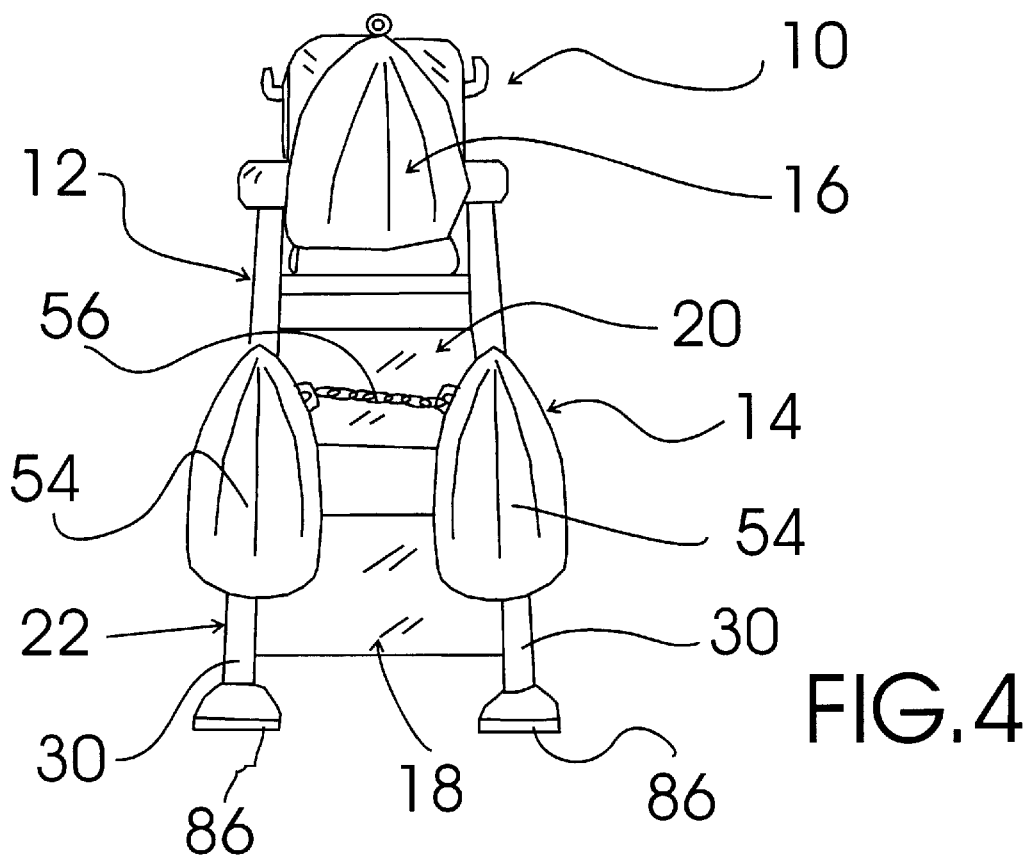
FIG. 4 is a back side, plan view of the collapsible fishing chair with detachable floats of FIG. 1.

In the embodiment shown in FIG. 2, the back legs 30 are each provided with a wheel 90 that is rotatably mounted on an axle 92.

It can be seen from the preceding description that a collapsible fishing chair with detachable floats has been provided.

It is noted that the embodiment of the collapsible fishing chair with detachable floats described herein in detail for exemplary purposes is of course subject to many different variations in structure, design, application and methodology. Because many varying and different embodiments may be made within the scope of the inventive concept s) herein taught, and because many modifications may be made in the embodiment herein detailed in accordance with the descriptive requirements of the law, it is to be understood that the details herein are to be interpreted as illustrative and not in a limiting sense.

What is claimed is:

1. A collapsible fishing chair with detachable floats comprising:
   a collapsible, extended leg, chair assembly;
   a detachable lower float assembly;
   a detachable upper float; and
   a storage device;
   said collapsible, extended leg, chair assembly including a folding chair frame including a tackle box arm assembly, a drink holder arm assembly, two front legs and two back legs pivotally connected to a chair back and seat assembly including a chair back member and a chair seat member such that said chair back and seat assembly is positionable between an unfolded seat forming position and a folded floating position;

said chair back and seat assembly including an umbrella and upper float attachment cavity formed into a top surface of said chair back member;

said detachable lower float assembly including two lower float members attached together by a flexible tether secured therebetween; each of said lower float members including a closed cell foam body having a chair leg receiving channel sized and shaped to snap fit over a section of one of said back legs;

said detachable upper float being constructed of closed cell foam and including a chair back member securing structure sized and shaped to friction fit into said umbrella and upper float attachment cavity formed into said top surface of said chair back member;

said storage device being attached to said two back legs and sized such that a top storage device surface including indentations therein for holding items is positioned between said two front legs and said two back legs when said chair back and seat assembly is positioned in said unfolded seat forming position;

said front legs being positioned between said back legs and said top storage device surface when said chair back and seat assembly is positioned in said folded floating position.

2. The collapsible fishing chair with said detachable floats of claim 1 wherein:

said two back legs have an axle and two wheels in connection therewith.

3. A collapsible fishing chair with detachable floats comprising:

a collapsible, extended leg, chair assembly;

a detachable lower float assembly;

a detachable upper float; and a storage device;

said collapsible extended leg, chair assembly including a folding chair frame including Et tackle box arm assembly, a drink holder arm assembly, two front legs and two back legs pivotally connected to a chair back and seat assembly including a chair back member and a chair seat member such that said chair back and seat assembly is positionable between an unfolded seat forming position and a folded floating position;

said chair back and seat assembly including an umbrella and upper float attachment cavity formed into a top surface of said chair back member;

said detachable lower float assembly including two lower float members attached together by a flexible tether secured therebetween;

each of said lower float member including a closed cell foam body having a chair leg receiving channel sized and shaped to snap fit over a section of one of said back legs;

said detachable upper float being constructed of closed cell foam and including a chair back member securing structure sized and shaped to friction fit into said umbrella and upper float attachment cavity formed into said top surface of said chair back member;

said storage device beings attached to said two back legs and sized such that a top storage device surface including indentations therein for holding items is positioned between said two front legs and said two back lees when said chair back and seat assembly is positioned in said unfolded seat forming position;

said front legs being Positioned between said back legs and said top storage device surface when said chair back and seat assembly is positioned in said folded floating position;

said collapsible fishing chair with said detachable upper and lower floats further including a front leg securing support foot attached to each of said two front legs, each of said front leg securing support feet having a back leg receiving channel provided therein sized and positioned to snap friction fit onto a section of one of said back legs when said chair back and seat assembly is positioned in said folded floating position; a bottom surface of each said front leg securing foot having a diameter at least three times the diameter of a front leg to which said front leg securing support foot is attached.

4. A collapsible fishing chair with detachable floats comprising:

a collapsible, extended leg, chair assembly;

a detachable lower float assembly;

a detachable upper float; and a storage device;

said collapsible, extended leg, chair assembly including a folding chair frame including a tackle box arm assembly, a drink holder arm assembly, two front legs and two back leas Pivotally connected to a chair back and seat assembly including a chair back member and a chair seat member such that said chair back and seat assembly is positionable between an unfolded seat forming position and a folded floating position;

said chair back and seat assembly including an umbrella and upper float attachment cavity formed into a top surface of said chair back member;

said detachable lower float assembly including two lower float members attached together by a flexible tether secured therebetween;

each of said lower float members including a closed cell foam body having a chair leg receiving channel sized and shaped to snap fit over a section of one of said back legs;

said detachable upper float being constructed of closed cell foam and including a chair back member securing structure sized and shaped to friction fit into said umbrella and upper float attachment cavity formed into said too surface of said chair back member;

said storage device being attached to said two hack legs and sized such that a top storage device surface including indentations therein for holding items is positioned between said two front legs and said two back legs when said chair back and seat assembly is positioned in said unfolded seat forming position;

said front less being positioned between said back legs and said top storage device surface when said chair back and seat assembly is positioned in said folded floating position;

said collapsible fishing chair with said detachable upper and lower floats further including a support foot attached to each of said two front legs and said back legs, each support foot having a bottom surface of a diameter at least three times the diameter of a, respective, front leg or back leg to which said support foot is attached.

* * * * *